(12) United States Patent
Hu et al.

(10) Patent No.: US 12,159,752 B2
(45) Date of Patent: Dec. 3, 2024

(54) OPTICAL ELEMENT DRIVING MECHANISM

(71) Applicant: TDK TAIWAN CORP., Taoyuan (TW)

(72) Inventors: Hsiao-Hsin Hu, Taoyuan (TW); Yi-Ho Chen, Taoyuan (TW); Chao-Chang Hu, Taoyuan (TW); Ya-Hsiu Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/970,931

(22) Filed: Oct. 21, 2022

(65) Prior Publication Data

US 2023/0127183 A1    Apr. 27, 2023

Related U.S. Application Data

(60) Provisional application No. 63/270,806, filed on Oct. 22, 2021.

(51) Int. Cl.
| | |
|---|---|
| G02B 7/02 | (2021.01) |
| G02B 7/00 | (2021.01) |
| G02B 7/04 | (2021.01) |
| G02B 7/08 | (2021.01) |
| G02B 27/64 | (2006.01) |
| G03B 9/14 | (2021.01) |
| H01F 7/08 | (2006.01) |
| H01F 7/16 | (2006.01) |
| H04N 23/51 | (2023.01) |
| H04N 23/54 | (2023.01) |
| H04N 23/55 | (2023.01) |

(52) U.S. Cl.
CPC ............. *H01F 7/081* (2013.01); *G02B 7/008* (2013.01); *G02B 7/02* (2013.01); *G02B 7/023* (2013.01); *G02B 7/04* (2013.01); *G02B 7/08* (2013.01); *G02B 27/646* (2013.01); *G03B 9/14* (2013.01); *H01F 7/16* (2013.01); *H04N 23/51* (2023.01); *H04N 23/54* (2023.01); *H04N 23/55* (2023.01)

(58) Field of Classification Search
CPC ......... H01F 7/081; H01F 7/16; G02B 7/0081; G02B 7/02; G02B 7/023; G02B 7/04; G02B 7/08; G02B 27/646; G03B 9/14; H04N 23/51; H04N 23/05; H04N 23/55
See application file for complete search history.

(56) References Cited

U.S. PATENT DOCUMENTS

| | | | |
|---|---|---|---|
| 2020/0033626 A1* | 1/2020 | Wu ..................... | G02B 7/023 |
| 2022/0252826 A1* | 8/2022 | Seo ..................... | G03B 13/36 |

* cited by examiner

*Primary Examiner* — Ahmed A Berhan
(74) *Attorney, Agent, or Firm* — MUNCY, GEISSLER, OLDS & LOWE, P.C.

(57) ABSTRACT

An optical element driving mechanism is provided, including a movable portion, a fixed portion, and a driving assembly. The movable portion is connected to an optical element. The fixed portion includes a bottom. The movable portion is movable relative to the fixed portion. The driving assembly drives the movable portion to move relative to the fixed portion. The driving assembly drives the optical element to move relative to the fixed portion.

19 Claims, 8 Drawing Sheets

OPTICAL ELEMENT DRIVING MECHANISM

CROSS REFERENCE TO RELATED APPLICATIONS

This application claims the benefit of U.S. Provisional Application No. 63/270,806, filed Oct. 22, 2021, the entirety of which is incorporated by reference herein.

BACKGROUND OF THE INVENTION

Field of the Invention

The present disclosure relates to an optical element driving mechanism, and more particularly to an optical element driving mechanism that is configured with magnetic elements.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable that they have optical qualities that are better and more stable, offering consumers more choice. As a result, it is important to effectively improve the stability and thus the image quality within limited device volume.

BRIEF SUMMARY OF THE INVENTION

An optical element driving mechanism is provided, including a movable portion, a fixed portion, and a driving assembly. The movable portion is connected to an optical element. The fixed portion includes a bottom. The movable portion is movable relative to the fixed portion. The driving assembly drives the movable portion to move relative to the fixed portion. The driving assembly drives the optical element to move relative to the fixed portion.

In some embodiments of the present disclosure, the optical element driving mechanism further includes a sensing assembly. The sensing assembly includes a first magnetic element, a second magnetic element and a sensing element. The first magnetic element is connected to the movable portion. The second magnetic element is connected to the movable portion, wherein the first magnetic element and the second magnetic element are arranged in a first direction. The sensing element is embedded in the bottom. The first direction is perpendicular to a direction of motion of the movable portion relative to the fixed portion. The first magnetic element only partially overlaps the sensing element when viewed in the direction of motion.

In some embodiments of the present disclosure, the second magnetic element does not overlap the sensing element when viewed in the direction of motion.

In some embodiments of the present disclosure, the distance between the sensing element and the optical element is shorter than the distance between the first magnetic element and the optical element. The distance between the sensing element and the first magnetic element is shorter than the distance between the sensing element and the second magnetic element.

In some embodiments of the present disclosure, a pair of magnetic poles of the first magnetic element are arranged in a first magnetic pole direction, and a pair of magnetic poles of the second magnetic element are arranged in a second magnetic pole direction. The first magnetic pole direction is parallel to the second magnetic pole direction, and the first magnetic pole direction is perpendicular to the first direction.

In some embodiments of the present disclosure, the optical element driving mechanism further includes a magnetic permeable element. The magnetic permeable element has a U-shaped board structure, and is disposed between the driving assembly and the first magnetic element. The driving assembly, the magnetic permeable element and the first magnetic element are arranged in a second direction. The second direction is perpendicular to the first direction.

In some embodiments of the present disclosure, the magnetic permeable element includes a first magnetic portion, a second magnetic portion, and a connection portion. The first magnetic portion corresponds to the first magnetic element. The second magnetic portion corresponds to the second magnetic element. The connection portion connects the first magnetic portion and the second magnetic portion. An opening is formed in between the first magnetic portion, the second magnetic portion, and the connection portion.

In some embodiments of the present disclosure, the movable portion passes through the magnetic permeable element from the opening to connect with the driving assembly.

In some embodiments of the present disclosure, the magnetic element further includes a first protruding portion and a second protruding portion. The first protruding portion is connected to the first magnetic portion, and is located on the other side of the first magnetic portion than the connection portion. The second protruding portion is connected to the second magnetic portion, and is located on the other side of the second magnetic portion than the connection portion. The first protruding portion and the second protruding portion both partially overlap the movable portion when viewed in the first direction.

In some embodiments of the present disclosure, a magnetic attraction force is formed by the magnetic permeable element and the first magnetic element and the second magnetic element. The magnetic attraction force is at least three times greater than the weight of the movable portion.

In some embodiments of the present disclosure, the magnetic attraction force is five to ten times greater than the weight of the movable portion.

In some embodiments of the present disclosure, the optical element driving mechanism further includes a circuit assembly. The circuit assembly has a board structure and is connected to the sensing element. The direction in which the circuit assembly extends is perpendicular to the direction of motion of the movable portion.

In some embodiments of the present disclosure, the circuit assembly includes four pins. Two of the pins are connected to the sensing element and a control device, and the other two pins are connected to the sensing element and a power source.

In some embodiments of the present disclosure, the optical element driving mechanism further includes a guiding assembly disposed between the movable portion and the fixed portion. The guiding assembly includes a first guiding element, a second guiding element, and a third guiding element. The first guiding element has a ball structure with a first radius and a first center of sphere. The second guiding element has a ball structure with a second radius and a second center of sphere. The third guiding element has a ball structure with a third radius and a third center of sphere. The first center of sphere, the second center of sphere, and the third center of sphere are arranged in a third direction. The third direction is parallel to the direction of motion.

In some embodiments of the present disclosure, the first radius and the second radius are the same.

In some embodiments of the present disclosure, the third radius is smaller than the first radius.

In some embodiments of the present disclosure, the third guiding element is disposed between the first guiding element and the second guiding element.

In some embodiments of the present disclosure, the first magnetic element has a first center. The distance between the first center and an upper surface of the bottom is larger than the distance between the third center of sphere and the upper surface.

In some embodiments of the present disclosure, the first magnetic element has a bottom surface. The distance between the bottom surface and the upper surface is larger than the distance between the second center of sphere and the upper surface.

In some embodiments of the present disclosure, the bottom of the fixed portion corresponds to an optical sensing module. The driving assembly drives the optical element to move relative to the optical sensing module.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
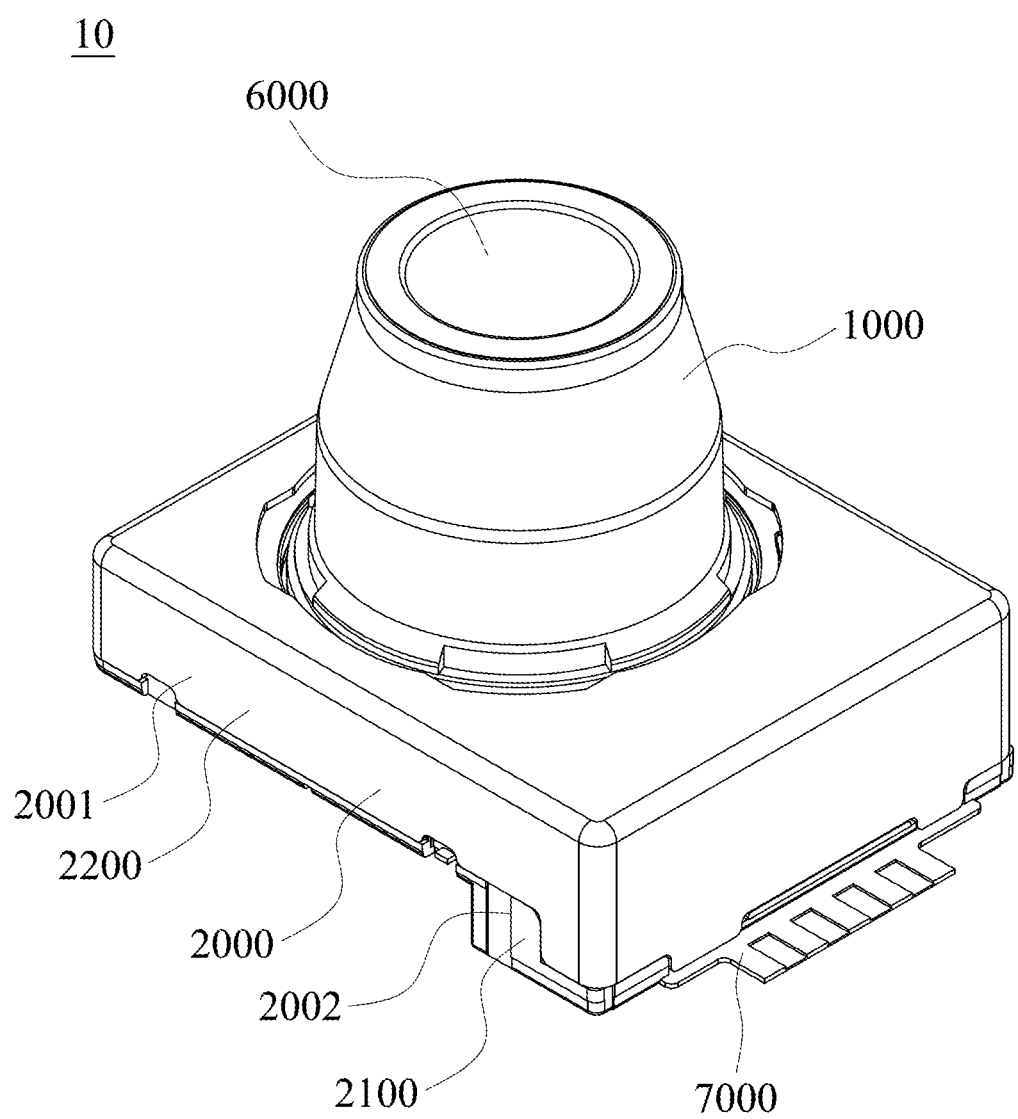
FIG. 1 is a perspective view of the optical element driving mechanism, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Referring to FIG. 1, FIG. 1 is a perspective view of the optical element driving mechanism 10, according to some embodiments of the present disclosure. As shown in FIG. 1, the optical element driving mechanism 10 mainly includes a movable portion 1000, a fixed portion 2000, an optical element 6000, and a circuit assembly 7000.

The movable portion 1000 is connected to the optical element 6000. The optical element 6000 may include one or more lenses, but it is not limited herein. The optical element 6000 may include any suitable optical elements. In the embodiment shown in FIG. 1, the optical element 6000 may include a lens barrel that holds one or more lenses. The lens barrel has a substantially cylindrical shape and a tapered structure. In some other embodiments, the optical element 6000 may have any suitable shapes. It should be noted that, according to some embodiments of the present disclosure, the optical element 6000 may extend beyond the fixed portion 2000 of the optical element driving mechanism 10. For example, in Z direction, the center of mass of the optical element 6000 may be higher than the top surface of the fixed portion 2000. For instance, the distance between the center of mass of the entire optical element 6000 and the top surface of the optical element 6000 may be about a quarter of the height (in Z direction) of the entire optical element 6000. In some embodiments in accordance to the present disclosure, the provided driving assembly 3000 is suitable for driving the optical element 6000 whose center of mass is higher than the fixed portion 2000. The detailed structure will be described below.

The fixed portion 2000 includes a bottom 2100 and a housing 2200. In some embodiments, the bottom 2100 and the housing 2200 may be adhered together by glue or in any suitable manners. An accommodating space is formed between the bottom 2100 and the housing 2200 for accommodating components of the optical element driving mechanism 10. In the optical element driving mechanism 10, components other than the optical element 6000 and the circuit assembly 7000 are all disposed between the bottom 2100 and the housing 2200. For example, the optical element 6000 may extend beyond the top surface of the housing 2200, while the circuit assembly 7000 may be disposed on the lower side of the bottom 2100 and be flush with the bottom surface of the bottom 2100. In the embodiment shown in FIG. 1, the circuit assembly 7000 has a board structure. The plane on which the circuit assembly 7000 extends is parallel to the bottom surface of the bottom 2100. That is, it is parallel to the XY plane. In the embodiment shown in FIG. 1, the movable portion 1000 brings the optical element 6000 to move relative to the fixed portion 2000 along Z direction. Therefore, the extending direction of the circuit assembly 7000 is perpendicular to the direction of motion of the movable portion 1000 (e.g. the direction of motion O, see FIG. 2).

In some embodiments, the bottom 2100 of the fixed portion 2000 corresponds to an optical sensing module (not shown). In the embodiment shown in FIG. 1, the optical sensing module may be disposed right below (in Z direction) the optical element 6000. In some embodiments according to the present disclosure, lights may go through the optical element 6000 and then be received by the optical sensing module. In the embodiment shown in FIG. 1, the fixed portion 2000 includes a first portion 2001 and a second portion 2002. When viewed in Y direction, the fixed portion 2000 may substantially has an L-shaped structure, wherein the portion that extends in X direction is referred to as the first portion 2001, and the portion that extends in Z direction is referred to as the second portion 2002. In some embodiments, the optical sensing module and the first portion 2001 of the fixed portion 2000 may be arranged in Z direction, and the optical sensing module and the second portion 2002 of the fixed portion 2000 may be arranged in X direction. That is, the optical sensing module may be accommodated in an accommodating space below the bottom 2100 of the fixed portion 2000, and be fixedly connected to the bottom 2100.

Figure 2:
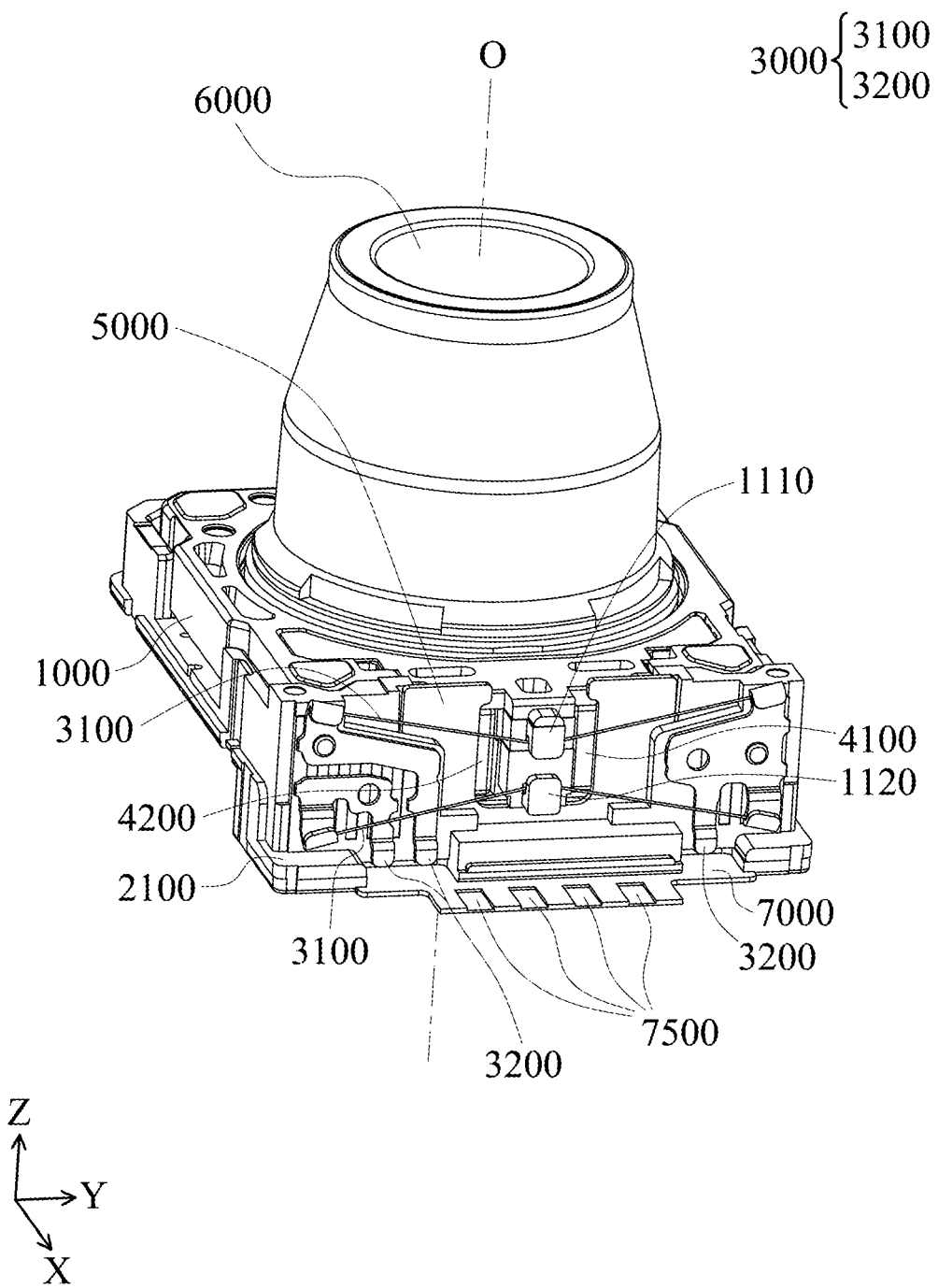
FIG. 2 is a perspective view of the optical element driving mechanism, according to some embodiments of the present disclosure, wherein the housing is omitted to clearly show the internal configuration of the optical element driving mechanism.

Referring to FIG. 2, FIG. 2 is a perspective view of the optical element driving mechanism 10, according to some embodiments of the present disclosure, wherein the housing 2200 is omitted to clearly show the internal configuration of the optical element driving mechanism 10. As shown in FIG. 2, the optical element driving mechanism 10 further includes a driving assembly 3000 for driving the movable portion 1000 to move relative to the fixed portion 2000. The driving assembly 3000 may include a driving element 3100 and an electrically conductive component 3200. In some embodiments, the driving element 3100 may include shape memory alloy (SMA). The movable portion 1000 is driven to move along the direction of motion O through deformation of the shape memory alloy. For example, in the embodiment shown in FIG. 2, the driving element 3100 includes two strings of shape memory alloy, both ends of which are electrically connected to the electrically conductive component 3200. When the electrically conductive component 3200 transmits electricity into the driving element 3100, the driving element 3100 deforms and brings the movable portion 1000 to move in the direction of motion O. The electrically conductive component 3200 may include one or more board-shaped elements. For example, in FIG. 2, the right-hand side of the bottom 2100 includes one board-shaped element, and the left-hand side of the bottom 2100 includes two board-shaped elements. Each of the board-shaped elements includes a hook structure that respectively corresponds and is electrically connected to each end of the driving element 3100. The board-shaped elements have the functions of electrically connecting an external power source or the ground. For example, in FIG. 2, the board-shaped element that is on the right-hand side of the bottom 2100 may be grounded, while the two board-shaped elements that are on the left-hand side of the fixed portion 2000 may be respectively connected to different electrodes.

In addition, the movable portion 1000 may include an upper part 1110 and a lower part 1120. The upper part 1110 and the lower part 1120 each have a hook structure. The hook structures respectively correspond to the driving element 3100 (e.g. shape memory alloy) of the driving assembly 3000. The contact point between the hook structure and the driving element 3100 may be regarded as the point of application for the driving assembly 3000 to drive the movable portion 1000.

Figure 3:
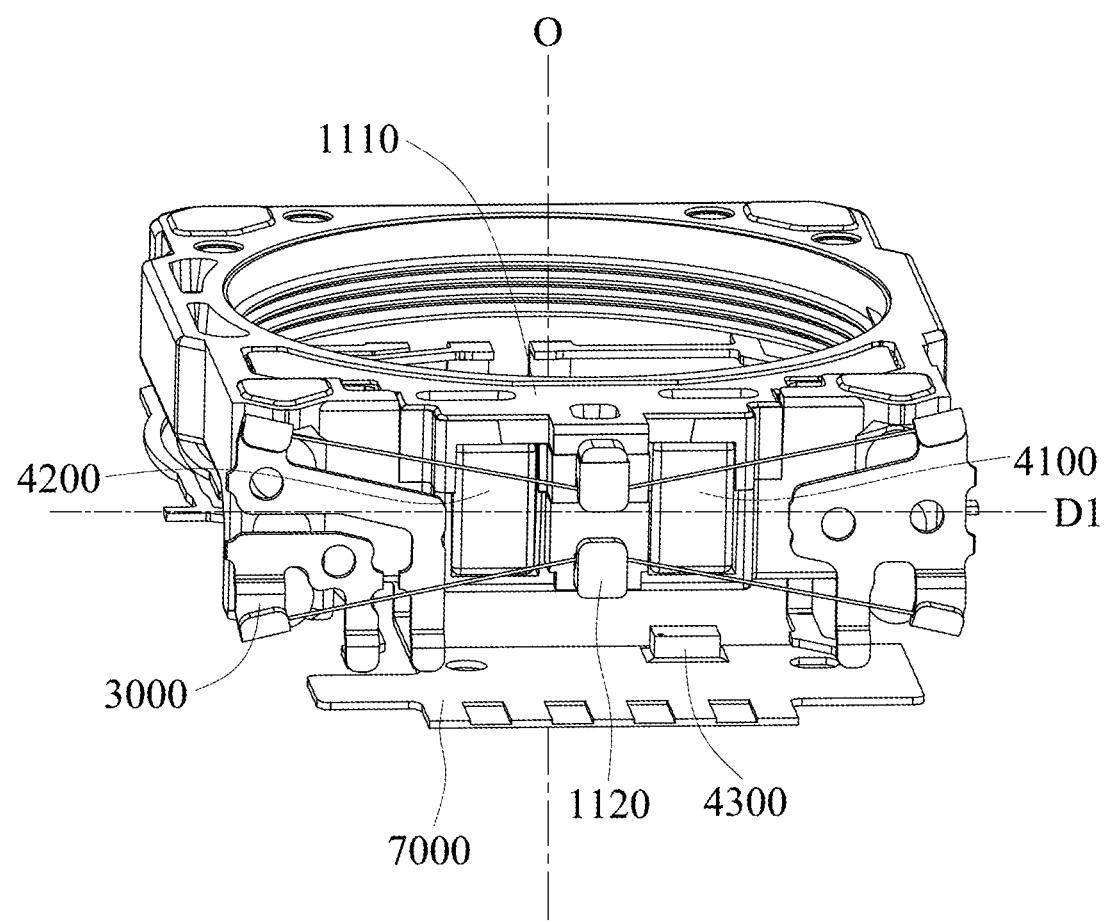
FIG. 3 is a front perspective view of the optical element driving mechanism, according to some embodiments of the present disclosure, wherein the fixed portion and the magnetic permeable element are omitted to clearly show the position of the sensing assembly.
Figure 4:
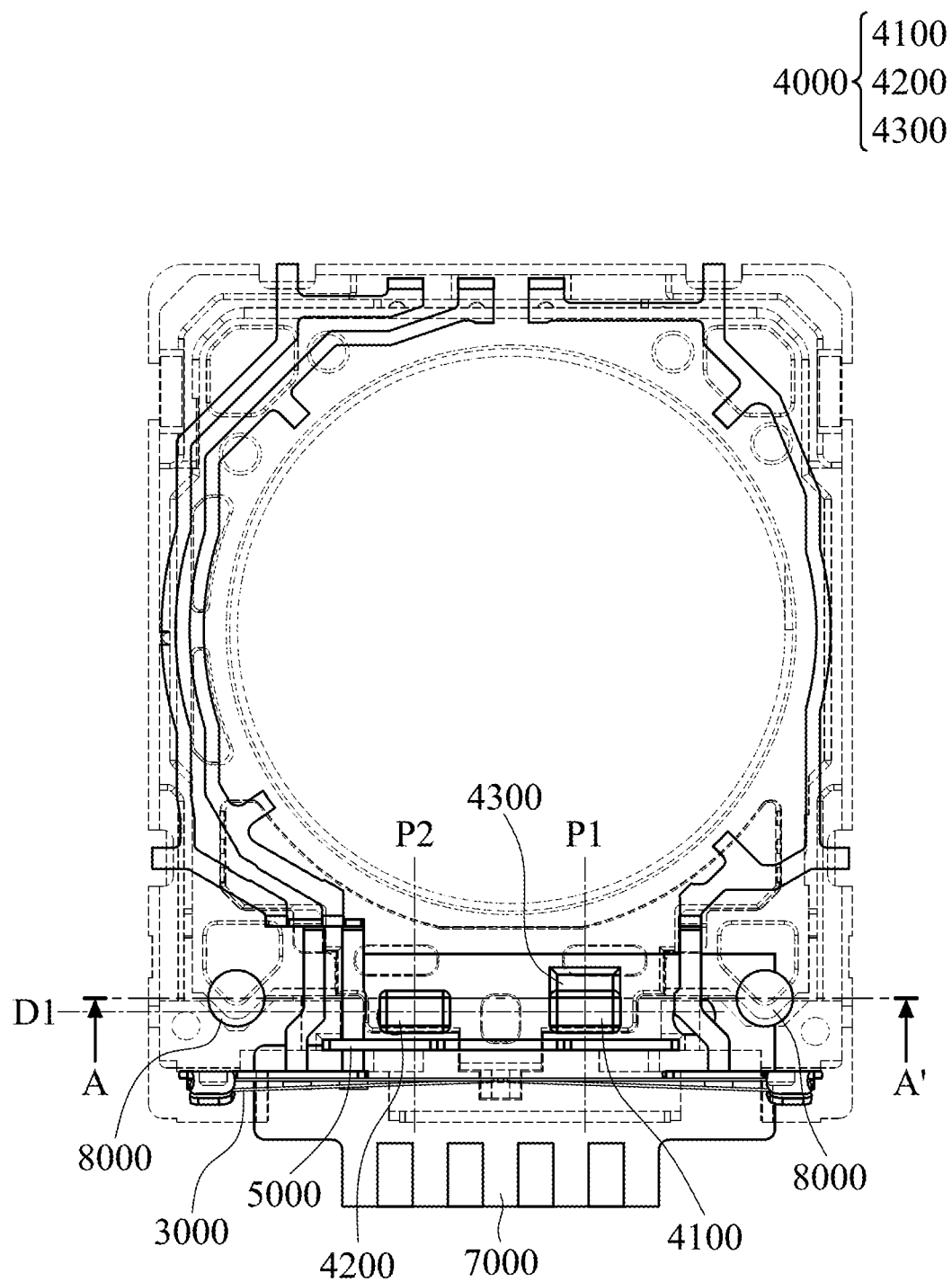
FIG. 4 is a top view of the optical element driving mechanism, according to some embodiments of the present disclosure, wherein the optical element is omitted.

Referring to FIGS. 3 and 4, FIG. 3 is a front perspective view of the optical element driving mechanism 10, according to some embodiments of the present disclosure, wherein the fixed portion 2000 and the magnetic permeable element 5000 are omitted to clearly show the position of the sensing assembly 4000. FIG. 4 is a top view of the optical element driving mechanism 10, according to some embodiments of the present disclosure, wherein the optical element 6000 is omitted. As shown in FIGS. 3 and 4, the optical element driving mechanism 10 further includes a sensing assembly 4000. The sensing assembly 4000 is mainly used for sensing the movement of the movable portion 1000 relative to the fixed portion 2000. The sensing assembly 4000 mainly includes a first magnetic element 4100, a second magnetic element 4200, and a sensing element 4300.

Both the first magnetic element 4100 and the second magnetic element 4200 are connected to the movable portion 1000. More specifically, both the first magnetic element 4100 and the second magnetic element 4200 are connected to the lower part 1120 of the movable portion 1000. In the embodiment shown in FIG. 3, the lower part 1120 of the movable portion 1000 includes two concaved portions for accommodating the first magnetic element 4100 and the second magnetic element 4200. In some embodiments, the first magnetic element 4100 and the second magnetic element 4200 may be magnets, and each has a pair of magnetic poles. The pair of the magnetic poles of the first magnetic element 4100 are arranged in the first magnetic pole direction P1, and the pair of the magnetic poles of the second magnetic element 4200 are arranged in the second magnetic pole direction P2. The first magnetic pole direction P1 is parallel to the second magnetic pole direction P2. In the embodiment shown in FIG. 4, the first magnetic element 4100 and the second magnetic element 4200 are arranged in the first direction D1, wherein the first direction D1 is parallel to the Y direction. In the embodiment shown in FIG. 4, both the first magnetic pole direction P1 and the second magnetic pole direction P2 are parallel to the X direction. That is, they are perpendicular to the first direction D1. In some embodiments, the first direction D1 is perpendicular to the direction of motion O that the fixed portion 2000 moves in.

The driving assembly 3000 is embedded in the bottom 2100 of the fixed portion 2000, and is disposed on the circuit assembly 7000. In some embodiments, the sensing element 4300 may include a Tunneling Magnetoresistance Effect Sensor (TMR Sensor) that detects the change in magnetic fields in Z direction of the drawings (i.e. the direction of motion O of the movable portion 1000). In some embodiments, the sensing element 4300 corresponds to the first magnetic element 4100 and/or the second magnetic element 4200. In the embodiments shown in FIGS. 3 and 4, the sensing element 4300 is not disposed in the mid-point between the first magnetic element 4100 and the second magnetic element 4200. The first magnetic element 4100 only partially overlaps the sensing element 4300 but not entirely overlaps when viewed along the direction of motion O. The second magnetic element 4200 does not overlap the sensing element 4300 when viewed along the direction of motion O. In other words, compared with the second magnetic element 4200, the first magnetic element 4100 is closer to the sensing element 4300. Therefore, the distance between the sensing element 4300 and the first magnetic element 4100 is shorter than the distance between the sensing element 4300 and the second magnetic element 4200. In X direction, compared with the first magnetic element 4100, the sensing element 4300 is closer to the optical element 6000 (or to the opening of the movable portion 1000 for accommodating the optical element 6000). Therefore, the distance between the sensing element 4300 and the optical element 6000 is shorter than the distance between the first magnetic element 4100 and the optical element 6000. In some embodiments, the sensing element 4300 may be electrically connected to the four pins 7500 on the circuit assembly 7000. For example, two of the pins 7500 may be electrically connected to the sensing element 4300 and a control device (not shown), while the other two pins 7500 may be electrically connected to the sensing element 4300 and a power source (not shown). The control device and the power source that are disposed outside the optical element driving mechanism 10 may provide the control signals and electric power that the sensing element 4300 needs.

Figure 5:
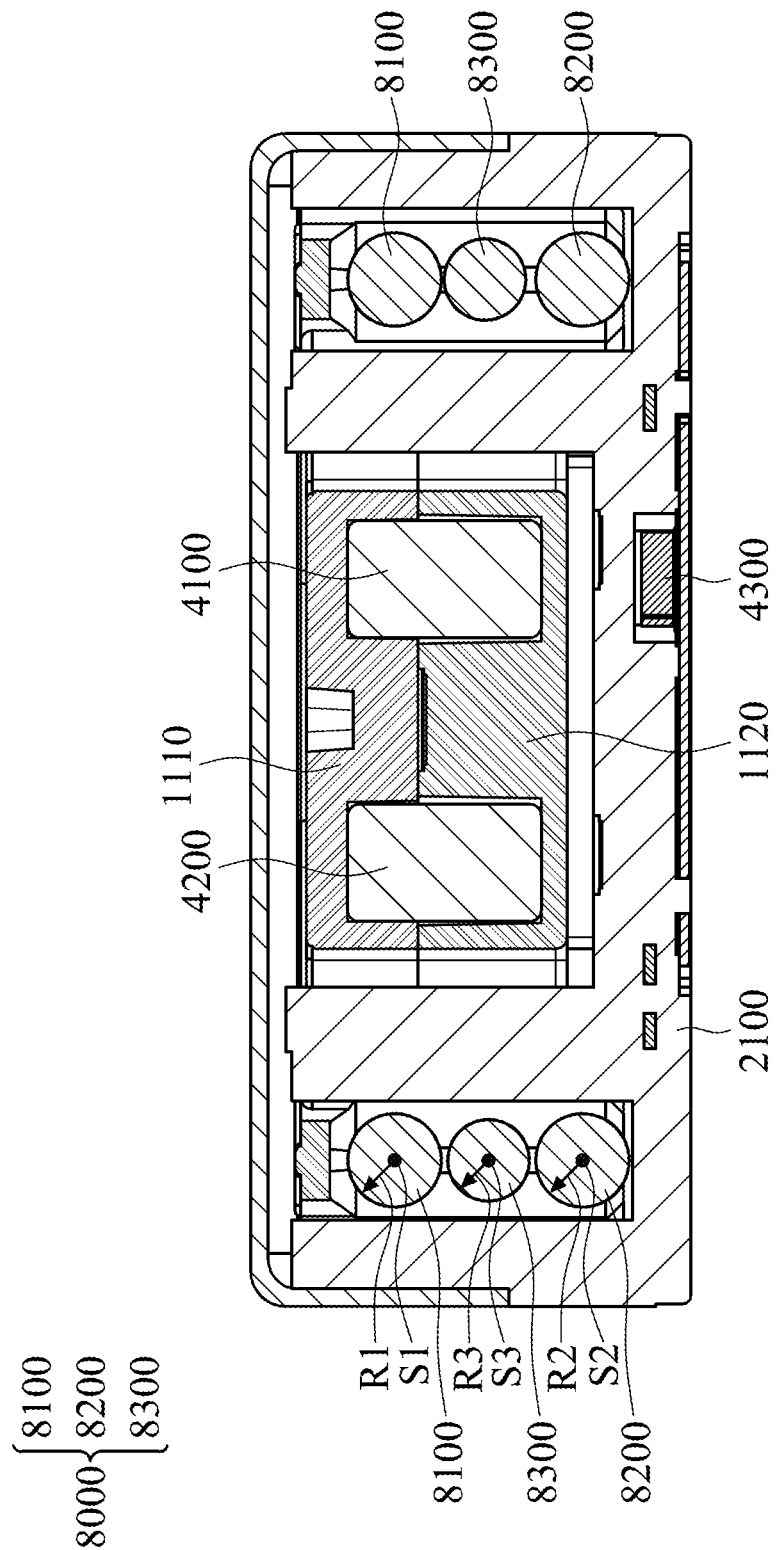
FIG. 5 is a cross-sectional view of the optical element driving mechanism along the line A-A' shown in FIG. 4, according to some embodiments of the present disclosure, wherein the optical element is omitted.

Referring to FIG. 5, FIG. 5 is a cross-sectional view of the optical element driving mechanism 10 along the line A-A' shown in FIG. 4, according to some embodiments of the present disclosure, wherein the optical element 6000 is omitted. As shown in FIG. 5, the optical element driving mechanism 10 may further include a guiding assembly 8000. The guiding assembly 8000 is movably disposed between the movable portion 1000 and the fixed portion 2000 for guiding the relative motion between the movable portion 1000 and the fixed portion 2000. The guiding assembly 8000 may include one or more balls or rollers. In some embodiments according to the present disclosure, the guiding assembly 8000 includes two sets of balls, respectively disposed on two sides of the fixed portion 2000 (in Y direction). The two sets of balls are arranged on the YZ plane. Each set of the balls may include a first guiding element 8100, a second guiding element 8200, and a third guiding element 8300. The first guiding element 8100 has a ball structure with the first radius R1 and the first center of sphere S1. The second guiding element 8200 has a ball structure with the second radius R2 and the second center of sphere S2. The third guiding element 8300 has a ball structure with the third radius R3 and the third center of sphere S3. In some embodiments according to the present disclosure, the first radius R1 and the second radius R2 are the same, and the third radius R3 is smaller than the first radius R1 and also smaller than the second radius R2. The third guiding element 8300 with smaller radius is disposed between the first guiding element 8100 and the second guiding element 8200. The third guiding element 8300 may be used for controlling the distance between the first guiding element 8100 and the second guiding element 8200. In some embodiments, the bigger the distance between the first guiding element 8100 and the second guiding element 8200 is, the more difficult it is for the optical element 6000 to tilt or deflect when it moves along the direction of motion O.

Figure 6:
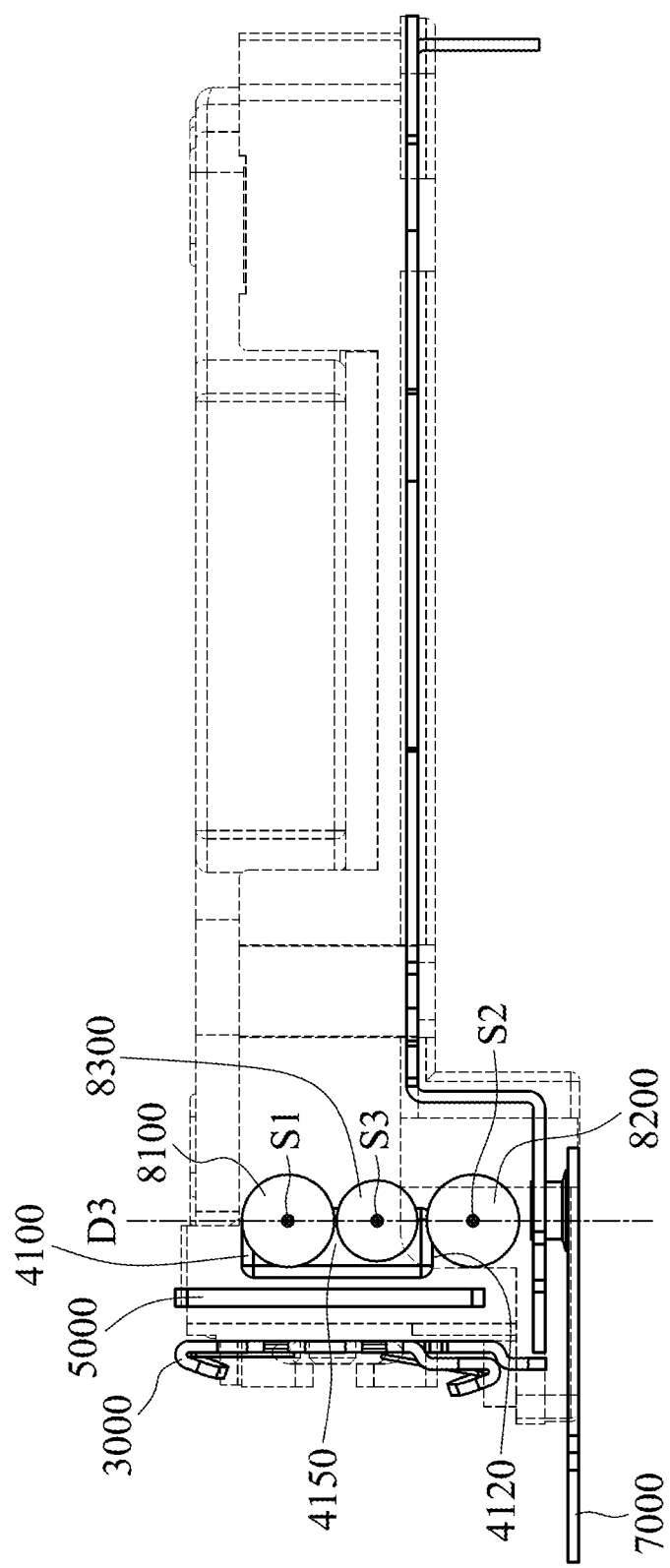
FIG. 6 is a side view of the optical element driving mechanism, according to some embodiments of the present disclosure, showing the relative positions of the driving assembly, the sensing assembly, the magnetic permeable element, and the guiding assembly.

Referring to FIG. 6, FIG. 6 is a side view of the optical element driving mechanism 10, according to some embodiments of the present disclosure, showing the relative positions of the driving assembly 3000, the sensing assembly 4000, the magnetic permeable element 5000, and the guiding assembly 8000. In some embodiments according to the present disclosure, the optical element driving mechanism 10 further includes a magnetic permeable element 5000. The magnetic permeable element 5000 is disposed between the driving assembly 3000 and the first magnetic element 4100 of the sensing assembly 4000. The magnetic permeable element 5000 may include metal materials or any magnetic permeable materials. A magnetic attraction force is formed by the magnetic permeable element 5000 and the first magnetic element 4100 and the second magnetic element 4200 to ensure the movable portion 1000 is attracted toward +X direction and abuts against the guiding assembly 8000 to improve the stability of the motion. In some embodiments, in order to stabilize the optical element 6000 whose center of mass is higher than the top surface of the fixed portion 2000, the magnetic attraction force may be at least three times greater than the weight of the movable portion 1000 (including the optical element 6000). In some specific embodiments, the magnetic attraction force may be five to ten times greater than the weight of the movable portion 1000 (including the optical element 6000).

As shown in FIG. 6, in the guiding assembly 8000, the first center of sphere S1 of the first guiding element 8100, the second center of sphere S2 of the second guiding element 8200, and the third center of sphere S3 of the third guiding element 8300 are arranged in the third direction D3. In some embodiments, the third direction D3 is parallel to the direction of motion O of the movable portion 1000. That is, it is parallel to the Z direction.

Figure 7:
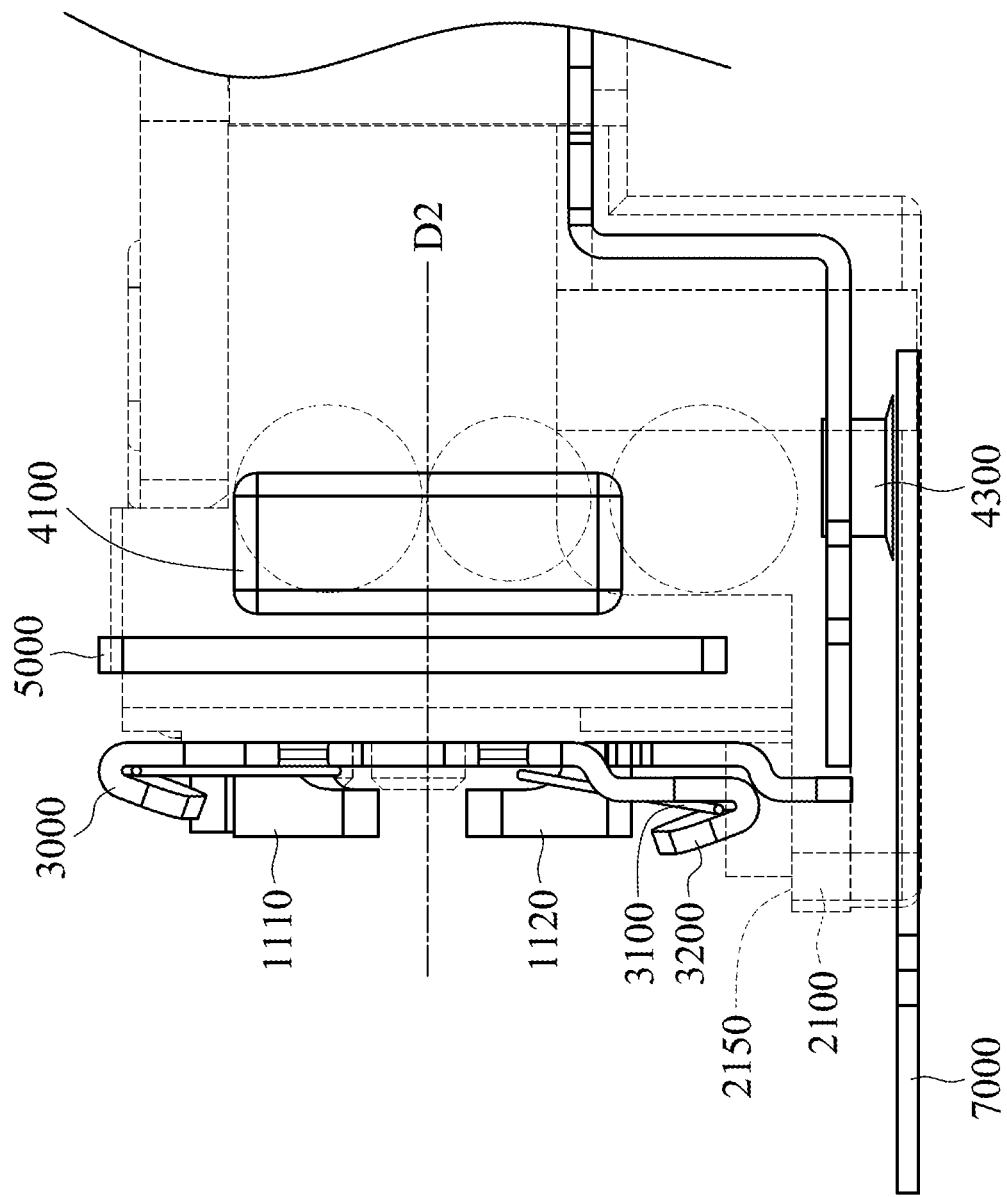
FIG. 7 is a zoom-in side view of the optical element driving mechanism, according to some embodiments of the present disclosure, showing the relative positions of the driving assembly, the sensing assembly, the magnetic permeable element, and the movable portion.

Referring to FIGS. 6 and 7, FIG. 7 is a zoom-in side view of the optical element driving mechanism 10, according to some embodiments of the present disclosure, showing the relative positions of the driving assembly 3000, the sensing assembly 4000, the magnetic permeable element 5000, and the movable portion 1000. Since the arrangement and position of the guiding assembly 8000 is related to stabilizing the movable portion 1000 and the required magnetic attraction forces, the relative position of the guiding assembly 8000 and the first magnetic element 4100 is important. It should be noted that the relative position of the guiding assembly 8000 and the first magnetic element 4100 is also important. However, only the first magnetic element 4100 is described herein as a representation.

As shown in FIG. 6, the first magnetic element 4100 has a first center 4150. The first center 4150 may be seen as the point of action of the magnetic force that is generated by the first magnetic element 4100. In the embodiments shown in FIGS. 6 and 7, the distance between the first center 4150 and the upper surface 2150 (the surface of the bottom 2100 that faces the magnetic permeable element 5000 in the third direction D3) of the bottom 2100 is larger than the distance between the third center of sphere S3 and the upper surface 2150. As shown in FIG. 6, the first magnetic element 4100 further has a bottom surface 4120. The bottom surface 4120 is the surface of the first magnetic element 4100 that faces the bottom 2100. The distance between the bottom surface 4120 and the upper surface 2150 is larger than the distance between the second center of sphere S2 and the upper surface 2150. As a result, it is ensured that the moment of force made by the magnetic attraction force to the first guiding element 8100 is larger than the moment of force made by the weight of the movable portion 1000 to the second guiding element 8200, preventing deflection of the movable portion 1000 during its movements.

In addition, as shown in FIGS. 4 and 6, the guiding assembly 8000 does not overlap the optical element 6000 when viewed in Z direction. Also, the guiding assembly 8000 may be disposed in the step structure of the fixed portion 2000 that protrudes and corresponds to the optical sensing module. Therefore, a larger space is obtained so that the distance between the first center of sphere S1 and the second center of sphere S2 may be increased, thereby improving the stability.

Figure 8:
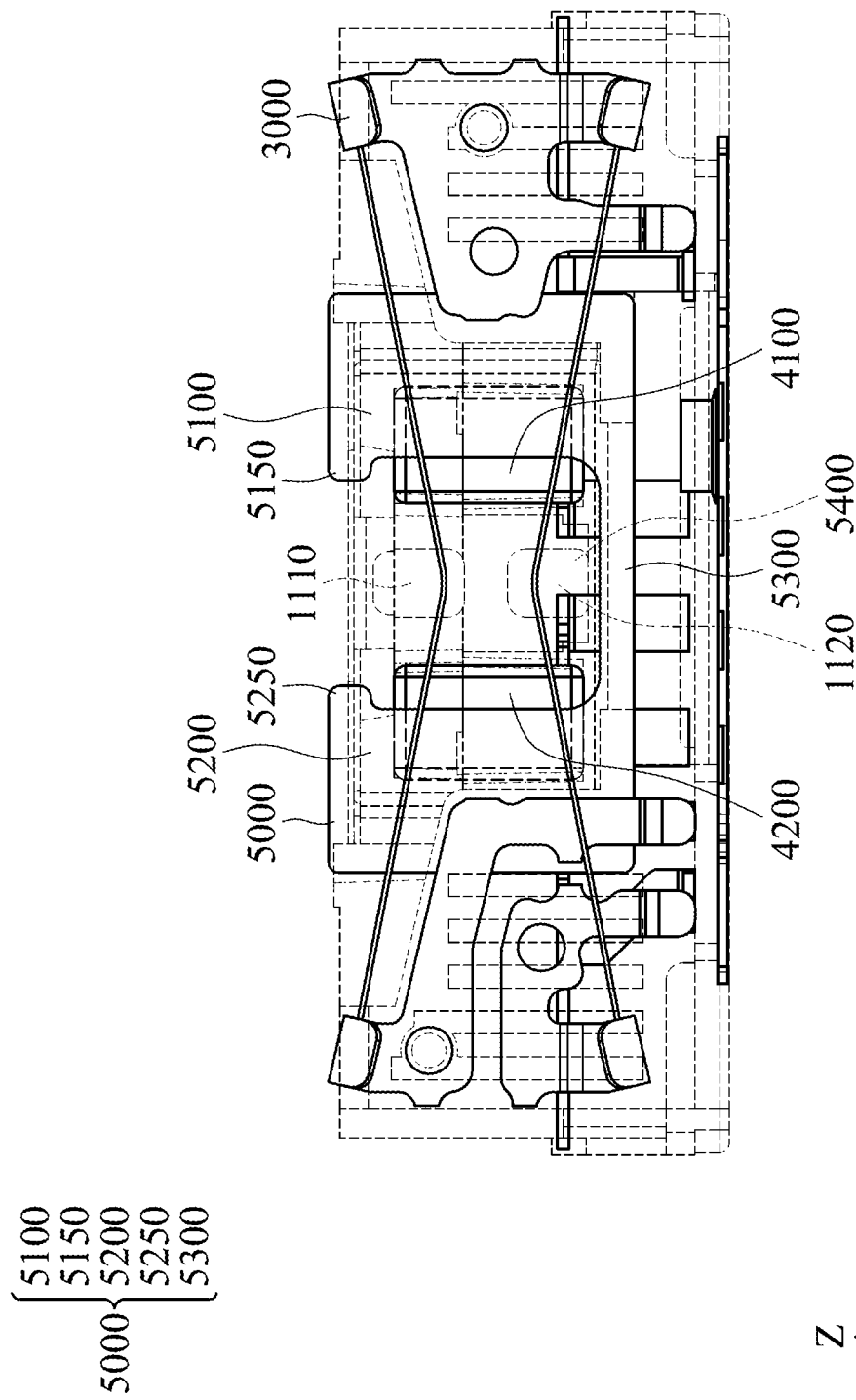
FIG. 8 is a front view of the optical element driving mechanism, according to some embodiments of the present disclosure, showing the configuration of the driving assembly, the sensing assembly, and the magnetic permeable element.

Referring to FIGS. 7 and 8, FIG. 8 is a front view of the optical element driving mechanism 10, according to some embodiments of the present disclosure, showing the configuration of the driving assembly 3000, the sensing assembly 4000, and the magnetic permeable element 5000. As shown in FIG. 7, the driving assembly 3000, the magnetic permeable element 5000, and the first magnetic element 4100 are sequentially arranged in the second direction D2. The second direction D2 is parallel to the X direction and is perpendicular to the first direction D1 (FIG. 4). As shown in FIG. 8, the magnetic permeable element 5000 has a U-shaped board structure. In some embodiments, the magnetic permeable element 5000 mainly includes a first magnetic portion 5100, a second magnetic portion 5200, and a connection portion 5300. The first magnetic portion 5100 corresponds to the first magnetic element 4100, but does not entirely overlap the first magnetic element 4100. As shown in FIG. 8, the first magnetic element 4100 may be partially exposed when viewed in X direction. Similarly, the second magnetic portion 5200 corresponds to the second magnetic element 4200, but does not entirely overlap the second magnetic element 4200. As shown in FIG. 8, the second magnetic element 4200 may be partially exposed when viewed in X direction. The connection portion 5300 extends along Y direction, connecting the first magnetic portion 5100 and the second magnetic portion 5200. As shown in FIG. 8, an opening 5400 is formed in between the first magnetic portion 5100, the second magnetic portion 5200, and the connection portion 5300. The movable portion 1000 passes through the magnetic permeable element 5000 from the opening 5400 to connect with the driving assembly 3000. More specifically, as shown in FIG. 7, in the movable portion 1000, the hook structures that are formed on the upper part 1110 and the lower part 1120 may pass through the opening 5400 and be connected to the driving element 3100 of the driving assembly 3000.

Since the first magnetic portion 5100, the second magnetic portion 5200, and the connection portion 5300 are integrally formed, they all are magnetic permeable and are able to generate magnetic attraction forces with the first magnetic element 4100 and the second magnetic element 4200. To prevent the magnetic attraction force generated by the connection portion 5300 that is only located on one side from affecting the stability of the entire mechanism, in some embodiments, the magnetic permeable element 5000 further includes a first protruding portion 5150 and a second protruding portion 5250. The first protruding portion 5150 is connected to the first magnetic portion 5100, is located on the other side of the first magnetic portion 5100 than the connection portion 5300 (e.g. the side that is closer to the +Z direction), and protrudes from the first magnetic portion 5100 along Y direction. Similarly, the second protruding portion 5250 is connected to the second magnetic portion 5200, is located on the other side of the second magnetic portion 5200 than the connection portion 5300 (e.g. the side that is closer to the +Z direction), and protrudes from the second magnetic portion 5200 along Y direction. In the embodiment shown in FIG. 8, the protruding directions of the first protruding portion 5150 and the second protruding portion 5250 are opposite from each other. More specifically, the first protruding portion 5150 may protrude toward +Y direction, while the second protruding portion 5250 may protrude toward −Y direction. In such embodiments, the first protruding portion 5150, the second protruding portion 5250, the first magnetic portion 5100 and the second magnetic portion 5200 are integrally formed, thus they all have magnetic permeability. As a result, the magnetic forces generated by the first protruding portion 5150 and the second protruding portion 5250 may balance out the magnetic force generated by the connection portion 5300, improving the overall stability. In some embodiments, the first protruding portion 5150 and the second protruding portion 5250 both partially overlap the movable portion 1000 when viewed in the first direction D1 (Y direction) or the second direction D2 (X direction). More specifically, the first protruding portion 5150 and the second protruding portion 5250 do not entirely protrude beyond the height of the movable portion 1000 in Z direction. This is helpful for further concentrating the magnetic attraction forces for the movable portion 1000.

In summary, in the optical element driving mechanism 10 provided in the present disclosure, the guiding assembly 8000 is disposed between the movable portion 1000 and the fixed portion 2000 for guiding the motion of the movable portion 1000 relative to the fixed portion 2000. By disposing the first magnetic element 4100, the second magnetic element 4200, and the magnetic permeable element 5000, magnetic forces are generated to ensure the contact between the guiding assembly 8000 and the movable portion 1000 and the fixed portion 2000, improving the stability of mechanism. Additionally, according to the configuration of the embodiments in the present disclosure, the relative positions of the guiding assembly 8000 and the sensing assembly 4000 makes the optical element driving mechanism 10 suitable for any optical element 6000 whose center of mass is beyond the top of the fixed portion 2000, providing better compatibility.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a movable portion connected to an optical element;
   a fixed portion including a bottom, wherein the movable portion is movable relative to the fixed portion; and
   a driving assembly driving the movable portion to move relative to the fixed portion;
   wherein the driving assembly drives the optical element to move relative to the fixed portion;
   wherein the optical element driving mechanism further comprises a sensing assembly, wherein the sensing assembly comprises:
   a first magnetic element connected to the movable portion;
   a second magnetic element, connected to the movable portion, wherein the first magnetic element and the second magnetic element are arranged in a first direction; and
   a sensing element embedded in the bottom;
   wherein:
   the first direction is perpendicular to a direction of motion of the movable portion relative to the fixed portion; and
   the first magnetic element only partially overlaps the sensing element when viewed in the direction of motion.

2. The optical element driving mechanism as claimed in claim 1, wherein the second magnetic element does not overlap the sensing element when viewed in the direction of motion.

3. The optical element driving mechanism as claimed in claim 2, wherein:
   the distance between the sensing element and the optical element is shorter than the distance between the first magnetic element and the optical element; and
   the distance between the sensing element and the first magnetic element is shorter than the distance between the sensing element and the second magnetic element.

4. The optical element driving mechanism as claimed in claim 1, wherein a pair of magnetic poles of the first magnetic element are arranged in a first magnetic pole direction, and a pair of magnetic poles of the second magnetic element are arranged in a second magnetic pole direction, wherein the first magnetic pole direction is parallel to the second magnetic pole direction, and the first magnetic pole direction is perpendicular to the first direction.

5. The optical element driving mechanism as claimed in claim 1, further comprising:
   a magnetic permeable element, having a U-shaped board structure, and disposed between the driving assembly and the first magnetic element;
   wherein the driving assembly, the magnetic permeable element and the first magnetic element are arranged in a second direction, wherein the second direction is perpendicular to the first direction.

6. The optical element driving mechanism as claimed in claim 5, wherein the magnetic permeable element comprises:
   a first magnetic portion corresponding to the first magnetic element;
   a second magnetic portion corresponding to the second magnetic element; and
   a connection portion connecting the first magnetic portion and the second magnetic portion;
   wherein an opening is formed in between the first magnetic portion, the second magnetic portion, and the connection portion.

7. The optical element driving mechanism as claimed in claim 6, wherein the movable portion passes through the magnetic permeable element from the opening to connect with the driving assembly.

8. The optical element driving mechanism as claimed in claim 6, wherein the magnetic element further comprises:
   a first protruding portion, connected to the first magnetic portion, and located on the other side of the first magnetic portion than the connection portion; and
   a second protruding portion, connected to the second magnetic portion, and located on the other side of the second magnetic portion than the connection portion;
   wherein the first protruding portion and the second protruding portion both partially overlap the movable portion when viewed in the first direction.

9. The optical element driving mechanism as claimed in claim 8, wherein a magnetic attraction force is formed by the magnetic permeable element and the first magnetic element and the second magnetic element, wherein the magnetic attraction force is at least three times greater than the weight of the movable portion.

10. The optical element driving mechanism as claimed in claim 9, wherein the magnetic attraction force is five to ten times greater than the weight of the movable portion.

11. The optical element driving mechanism as claimed in claim 1, further comprising a circuit assembly, wherein the circuit assembly has a board structure and is connected to the sensing element;
    wherein the direction in which the circuit assembly extends is perpendicular to the direction of motion of the movable portion.

12. The optical element driving mechanism as claimed in claim 11, wherein the circuit assembly comprises four pins, wherein two of the pins are connected to the sensing element and a control device, and the other two pins are connected to the sensing element and a power source.

13. The optical element driving mechanism as claimed in claim 1, further comprising:
    a guiding assembly disposed between the movable portion and the fixed portion, comprising:
    a first guiding element, having a ball structure with a first radius and a first center of sphere;
    a second guiding element, having a ball structure with a second radius and a second center of sphere; and
    a third guiding element, having a ball structure with a third radius and a third center of sphere;
    wherein the first center of sphere, the second center of sphere, and the third center of sphere are arranged in a third direction, wherein the third direction is parallel to the direction of motion.

14. The optical element driving mechanism as claimed in claim 13, wherein the first radius and the second radius are the same.

15. The optical element driving mechanism as claimed in claim 14, wherein the third radius is smaller than the first radius.

16. The optical element driving mechanism as claimed in claim 15, wherein the third guiding element is disposed between the first guiding element and the second guiding element.

17. The optical element driving mechanism as claimed in claim 13, wherein the first magnetic element has a first center, wherein the distance between the first center and an upper surface of the bottom is larger than the distance between the third center of sphere and the upper surface.

18. The optical element driving mechanism as claimed in claim 17, wherein the first magnetic element has a bottom surface, wherein the distance between the bottom surface and the upper surface is larger than the distance between the second center of sphere and the upper surface.

19. The optical element driving mechanism as claimed in claim 1, wherein the bottom of the fixed portion corresponds to an optical sensing module, wherein the driving assembly drives the optical element to move relative to the optical sensing module.

* * * * *